(12) United States Patent
Huddleston et al.

(10) Patent No.: US 10,465,048 B2
(45) Date of Patent: Nov. 5, 2019

(54) APPARATUS AND PROCESS FOR FORMING PARTICLES

(71) Applicant: The Procter & Gamble Company, Cincinnati, OH (US)

(72) Inventors: RIchard Albert Huddleston, Cincinnati, OH (US); Niteen Vasant Bapat, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 363 days.

(21) Appl. No.: 15/401,514

(22) Filed: Jan. 9, 2017

(65) Prior Publication Data
US 2018/0194905 A1    Jul. 12, 2018

(51) Int. Cl.
| | | |
|---|---|---|
| C08J 3/12 | (2006.01) | |
| C08L 71/02 | (2006.01) | |
| B01J 2/26 | (2006.01) | |
| B29C 43/08 | (2006.01) | |
| B29C 43/34 | (2006.01) | |
| B29K 223/00 | (2006.01) | |

(52) U.S. Cl.
CPC . *C08J 3/12* (2013.01); *B01J 2/26* (2013.01); *B29C 43/085* (2013.01); *B29C 43/34* (2013.01); *C08L 71/02* (2013.01); *B29C 2043/3438* (2013.01); *B29K 2223/04* (2013.01); *C08J 2371/02* (2013.01); *C08L 2205/02* (2013.01)

(58) Field of Classification Search
CPC ........ C08J 3/12; B01J 2/20; B01J 2/26; B01F 15/0275; B01F 15/02
USPC .......................................................... 386/186
See application file for complete search history.

(56) References Cited

U.S. PATENT DOCUMENTS

| | | | |
|---|---|---|---|
| 4,279,579 A | 7/1981 | Froeschke | |
| 4,671,914 A * | 6/1987 | Prochazka | ................ B01J 2/20 264/118 |
| 5,013,498 A | 5/1991 | Froeschke | |
| 5,286,181 A | 2/1994 | Schwager | |
| 5,770,235 A | 6/1998 | Baumann et al. | |
| 5,965,676 A | 10/1999 | Anan et al. | |
| 7,008,644 B2 | 3/2006 | Batycky et al. | |

(Continued)

FOREIGN PATENT DOCUMENTS

| | | |
|---|---|---|
| DE | 1667134 | 6/1971 |
| EP | 0511197 A1 | 10/1992 |

(Continued)

OTHER PUBLICATIONS

International Search Report for International ApplicationSerial No. PCT/US2018/012889, dated May 16, 2018, 13, pages.

*Primary Examiner* — Christina A Johnson
*Assistant Examiner* — Xue H Liu
(74) *Attorney, Agent, or Firm* — Gary J. Foose

(57) ABSTRACT

An apparatus and process for forming particles. A precursor material is provided to a rotor-stator construction and fed through apertures in the cylinder. The apertures are in intermittent fluid communication with the stator. A conveyor is provided beneath the cylinder. The conveyor has recesses and the recesses move in registration with the apertures in the cylinder. The precursor material is passed through the apertures and deposited in the recesses in an amount that overfills the recesses. The deposited precursor material is cooled to form a plurality of particles.

20 Claims, 9 Drawing Sheets

(56) References Cited

U.S. PATENT DOCUMENTS

| | | |
|---|---|---|
| 7,867,968 B1 | 1/2011 | Aouad |
| 8,476,219 B2 | 7/2013 | Aouad |
| 9,763,860 B2 | 9/2017 | Sodd |
| 9,878,467 B2 | 1/2018 | Huddleston et al. |
| 2003/0180283 A1 | 9/2003 | Batycky |
| 2005/0129792 A1* | 6/2005 | Kleinhans ............... B01J 2/20 425/6 |
| 2010/0288005 A1 | 11/2010 | Schromm |
| 2011/0146509 A1* | 6/2011 | Welygan ............... B41M 1/12 101/129 |
| 2013/0112370 A1 | 5/2013 | Schromm |
| 2016/0121286 A1 | 5/2016 | Sodd et al. |
| 2016/0122693 A1 | 5/2016 | Sodd |
| 2016/0368169 A1* | 12/2016 | Huddleston ............... B01J 2/04 |
| 2017/0260481 A1 | 9/2017 | Vasquez Valdivieso |
| 2017/0260482 A1 | 9/2017 | Vasquez Valdivieso |
| 2017/0340528 A1 | 11/2017 | Sodd |
| 2017/0349865 A1 | 12/2017 | Zerhusen et al. |
| 2018/0104858 A1 | 4/2018 | Huddleston |

FOREIGN PATENT DOCUMENTS

| | | |
|---|---|---|
| EP | 2716620 A3 | 12/2017 |
| JP | S53142983 A | 11/1978 |
| JP | H10195205 A | 7/1998 |
| JP | 2006509717 A | 3/2006 |
| JP | 2007116493 A | 5/2007 |
| JP | 2013509508 A | 3/2013 |
| WO | WO9748486 A1 | 12/1997 |

\* cited by examiner

APPARATUS AND PROCESS FOR FORMING PARTICLES

FIELD OF THE INVENTION

Process and apparatus for forming particles.

BACKGROUND OF THE INVENTION

There are a variety of approaches for forming particles from flowable masses. Often the flowable mass is a melt. Melts are commonly prepared by providing one or more raw materials in a molten form into a batch mixer. The mixer is sized and dimensioned to provide for a desired residence time for the raw material or materials in the mixer to sufficiently mix and or react the raw material or materials and provide a uniform temperature to the melt. After exiting the batch mixer, the melt can optionally be passed through one or more filters to remove deleterious matter. The melt can then be fed into a feed pump that moves the melt via a feed pipe from the feed pump to the apparatus that dispenses the melt to form particles.

One approach available for dispensing the melt to form particles is rotoforming. In a typical rotoforming process, the melt is transported through the feed pipe to a stator. A cylinder having a plurality of apertures is rotated about the stator and the apertures intermittently are in fluid communication with the stator. The melt is dispensed form the apertures in registration with stator and deposited on a moving conveyor having a flat surface. The melt is cooled on the conveyor to form a plurality of particles.

The shapes of particles that can be generated by depositing the precursor material onto a flat conveyor are generally limited to particles having a flat surface. The flat surface of the particle tends to correspond with the flat surface of the conveyor upon which the particle rests when formed. Depending on the rheological and wetting properties of the melt, the particles may be dome shaped. That is the particles may have one generally flat surface and the remainder of the surface may be a curved surface.

Dome shaped particles, when poured into a container, can tend to pack in a container less efficiently than particles having a shape that tends towards more spherical. When dome shaped particles having a flat surface are poured into a container, the packing of the particles is likely to be less than optimum. Thus, the mass of such particles that can be contained in a container of a particular volume tends to be lower than what could be obtained if the packing was optimum regardless of shape of the particles or if the particles had some other shape that is optimal for packing. Optimal packing can be preferred because it can provide for consistent fill levels amongst containers having the same shape and fill weight.

With these limitations in mind, there is a continuing unaddressed need for apparatuses and processes for forming particles that can be packed into containers efficiently.

SUMMARY OF THE INVENTION

An apparatus for forming particles, the apparatus comprising: a feed pipe;
a stator in fluid communication with the feed pipe; a cylinder rotationally mounted about the stator and rotatable about a longitudinal axis of the cylinder, wherein the cylinder has a periphery and the cylinder comprises a plurality of apertures disposed about the periphery, wherein the apertures are intermittently in fluid communication with the stator as the cylinder rotates about the stator; a conveyor beneath the cylinder and movable in translation relative to the longitudinal axis, wherein the conveyor comprises a plurality of recesses in registration with the apertures.

A process of forming particles comprising the steps of: providing a precursor material to a feed pipe; providing the precursor material to a stator in fluid communication with the feed pipe; providing a cylinder rotationally mounted about the stator and rotating about a longitudinal axis of the cylinder, wherein the cylinder has a periphery and the cylinder comprises a plurality of apertures disposed about the periphery, wherein the apertures are intermittently in fluid communication with the stator as the cylinder rotates about the stator; providing a conveyor beneath the cylinder and moving in translation relative to the longitudinal axis, wherein the conveyor comprises a plurality of recesses moving in registration with the apertures; passing the precursor material through the apertures; depositing the precursor material into the recesses; and cooling the precursor material deposited into the recesses to form a plurality of solid particles.

DETAILED DESCRIPTION OF THE INVENTION

Figure 1:
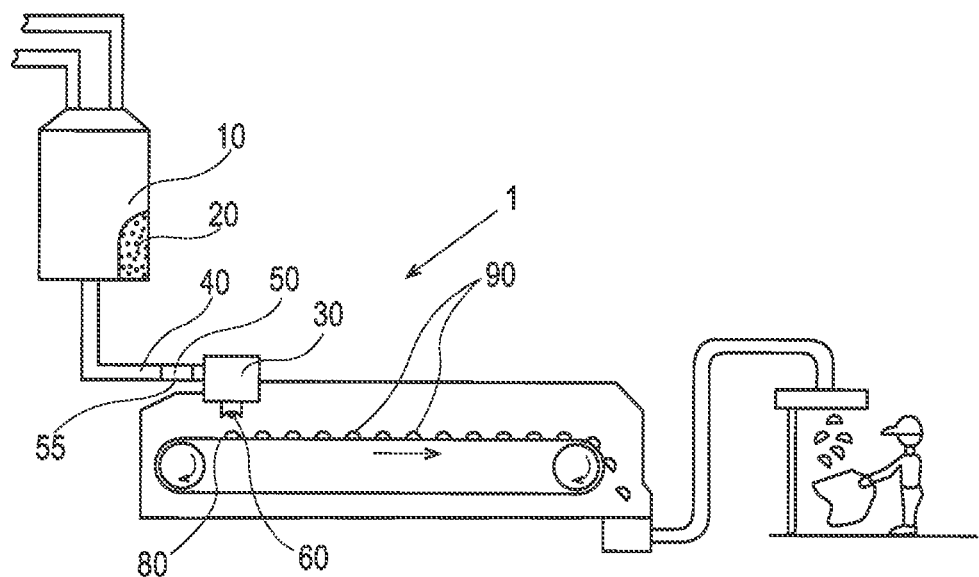
FIG. 1 is an apparatus for forming particles.

An apparatus 1 for forming particles is shown in FIG. 1. The raw material or raw materials can be provided to a batch mixer 10. The batch mixer 10 can have sufficient capacity to retain the volume of raw materials provided thereto for a sufficient residence time to permit the desired level of mixing and or reaction of the raw materials. The material leaving the batch mixer 10 is the precursor material 20. The precursor material 20 can be a molten product. The batch mixer 10 can be a dynamic mixer. A dynamic mixer is a mixer to which energy is applied to mix the contents in the mixer. The batch mixer 10 can comprise one or more impellers to mix the contents in the batch mixer 10.

Between the batch mixer 10 and the distributor 30, the precursor material 20 can be transported through the feed pipe 40. The feed pipe 40 can be in fluid communication with the batch mixer 10. An intermediate mixer 55 can be provided in fluid communication with the feed pipe 40 between the batch mixer 10 and the distributor 30. The intermediate mixer 55 can be a static mixer 50 in fluid communication with the feed pipe 40 between the batch mixer 10 and the distributor 30. The intermediate mixer 55, which can be a static mixer 50, can be downstream of the batch mixer 10. Stated otherwise, the batch mixer 10 can be upstream of the intermediate mixer 55 or static mixer 55 if employed. The intermediate mixer 55 can be a static mixer 50. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, N.C., United States of America.

The intermediate mixer 55 can be a perforated disc mill, toothed colloid mill, or DIL Inline Homogenizer, available from FrymaKoruma, Rheinfelden, Switzerland.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The conveyor 80 can be moveable in translation relative to the distributor 30.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

The intermediate mixer 55 can be a static mixer 50. The static mixer 50 can be mounted in fluid communication with the feed pipe 40. A static mixer 50 provides for transport of the precursor material 20 through the static mixer 40 and one or more obstructions within the static mixer 50 that disrupts flow of the precursor material 20 through the static mixer 50. The disruption of flow of the precursor material 20 within the static mixer mixes the precursor material 20. The energy required for mixing the precursor material 20 as it flows through the static mixer is derived from the loss in energy of the precursor material 20 as it flows through the static mixer. A static mixer 50 is a mixer in which the energy required for mixing is derived from the loss in energy of the material passing through the static mixer 50.

There are a variety of static mixers 40 that can be employed in the apparatus 1. The static mixer 50 can be a helical static mixer 40. A helical static mixer 50 can comprise one or more fluid disrupting elements. Optionally, the static mixer 50 can be a plate static mixer. The static mixer 50 can be provided in a cylindrical or squared housing or other suitably shaped housing. A variety of different arrangements of fluid disrupting elements can be provided. The fluid disrupting elements can be designed to split the flow of the precursor material 20 into multiple streams and direct those streams to various positions across the cross section of the static mixer. The fluid disrupting elements can be designed to provide for turbulence in the flow of the precursor material 20, the eddies created by the turbulence mixing the precursor material 20. The static mixer 50 can be a Kenics 1.905 cm inside diameter KMS 6, available from Chemineer, Dayton, Ohio, USA.

Figure 2:
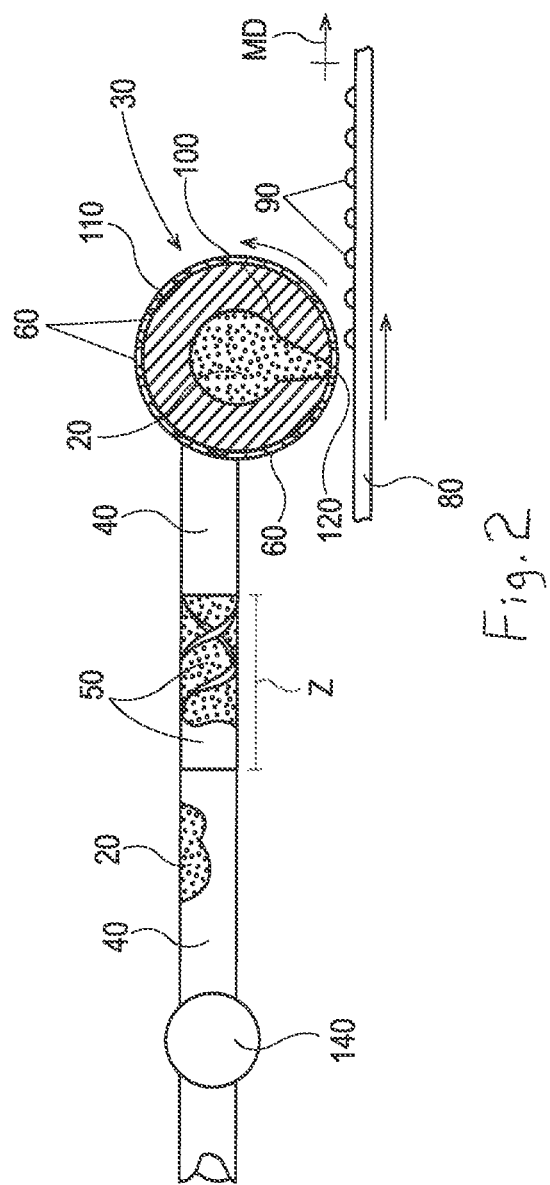
FIG. 2 is a portion of an apparatus.

The distributor 30 can be a cylinder 110 rotationally mounted about a stator 100 with the stator being in fluid communication with the feed pipe 40 and the cylinder 110 can have a periphery 120 and there can be a plurality of apertures 60 in the periphery 120, as shown in FIG. 2. So, the apparatus 1 can comprise a stator 100 in fluid communication with the feed pipe 40. The feed pipe 40 can feed the precursor material 20 to the stator 100 after the precursor material 20 has passed through the static mixer 50.

The apparatus 1 can comprise a cylinder 110 rotationally mounted about the stator 100. The stator 100 is fed precursor material through one or both ends 130 of the cylinder 110. The cylinder 110 can have a longitudinal axis L passing through the cylinder 110 about which the cylinder 110 rotates. The cylinder 110 has a periphery 120. There can be a plurality of apertures 60 in the periphery 120 of the cylinder 110.

As the cylinder 110 is driven to rotate about its longitudinal axis L, the apertures 60 can be intermittently in fluid communication with the stator 100 as the cylinder 110 rotates about the stator 100. The cylinder 110 can be considered to have a machine direction MD in a direction of movement of the periphery 120 across the stator 100 and a cross machine direction on the periphery 120 orthogonal to the machine direction MD. The stator 100 can similarly be considered to have a cross machine direction CD parallel to the longitudinal axis L. The cross machine direction of the stator 100 can be aligned with the cross machine direction of the cylinder 110. The stator 100 can have a plurality of distribution ports 120 arranged in a cross machine direction CD of the stator 100. The distribution ports 120 are portions or zones of the stator 100 supplied with precursor material 20.

In general, precursor material 20 can be fed through the static mixer 50 and feed pipe 40 to the stator 100. The stator 100 can distribute the precursor feed material 20 across the operating width of the cylinder 110. As the cylinder 110 rotates about its longitudinal axis, precursor material 20 is fed through the apertures 60 as the apertures 60 pass by the stator 100. A discrete mass of precursor material 20 is fed through each aperture 60 as each aperture 60 encounters the stator 100. The mass of precursor material 20 fed through each aperture 60 as each aperture 60 passes by the stator 100 can be controlled by controlling one or both of the pressure of the precursor material within the stator 100 and the rotational velocity of the cylinder 110.

Drops of the precursor material 20 are deposited on the conveyor 80 across the operating width of the cylinder 110. The conveyor 80 can be moveable in translation relative to the longitudinal axis of the cylinder 110. The velocity of the conveyor 80 can be set relative to the tangential velocity of the cylinder 110 to control the shape that the precursor material 20 has once it is deposited on the conveyor 80. The velocity of the conveyor 80 can be the about the same as the tangential velocity of the cylinder 110.

Figure 3:
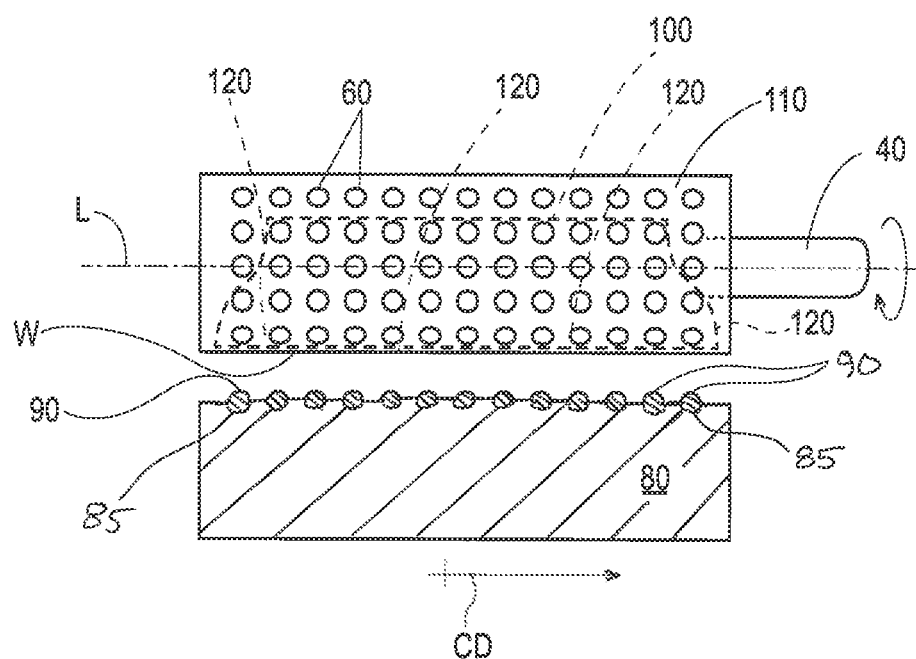
FIG. 3 is an end view an apparatus.
Figure 4:
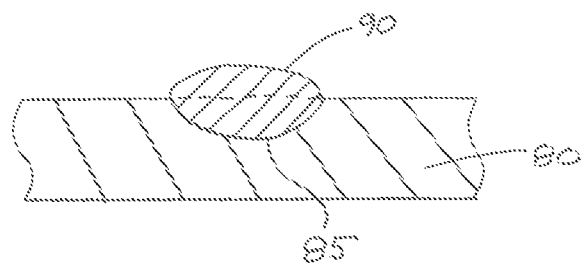
FIG. 4. is a cross section of a portion of a conveyor and a particle formed therein.

A view of the apparatus 1 in the machine direction MD looking downstream is shown in FIG. 3. As shown in FIG. 3, the apparatus 1 can have an operating width W and the cylinder 110 can rotate about longitudinal axis L. The conveyor 80 is shown in cross section. As shown in FIG. 3, the conveyor 80 can have a plurality of recesses 85. The recesses 85 can be in registration with the apertures 60.

Drops of precursor material 20 are deposited in the recesses 85 of the conveyor 80. The amount of precursor material 20 deposited into each recess 85 can be controlled for example by controlling the line speed, rheological properties of the precursor material 20, and flow rate of precursor material 20 through the apertures 60.

The apertures 60 can have an open area of from about 0.5 $mm^2$ to about 20 $mm^2$. The apertures 60 can have an open area of from about 0.5 $mm^2$ to about 5 $mm^2$. The apertures can have a diameter of about 2 mm.

The precursor material 20 can be deposited in the recesses 85 in an amount that overfills the recesses 85. This will tend to result in particles 90 that have one side having the shape of the recess 85 in which the particle 90 was formed. The opposing side will have a resulting shape that is a function of the volume of precursor material 20 deposited for each recess 85 and how the precursor material 20 flows and solidifies.

The recesses 85 can be substantially hemispherical recesses 85. The recesses 85 can be hemispherical recesses 85. Substantially hemispherical recesses 85 and or hemispherical recesses 85 can be practical for forming particles 90 that have a three dimensional shape tending towards spherical. Precursor material 20 deposited into and above an individual recess 85 can tend to have one surface that corresponds to the shape of the recess 85. By overfilling the recess 85, precursor material 20 deposited in excess of the volume of the recess 85 will mound up above the recess 85. Depending on how much excess precursor material 20 is deposited, how the precursor material 20 flows, and how the precursor material 20 solidifies, a variety of shapes of particles are possible.

A localized cross section of a portion of a conveyor 80 illustrating a cross sectional shape of a recess 85 and the shape of particle 90 that can be formed by such recess 85 are shown in FIGS. 4, 5, 6, and 7. The shapes of the recesses 85 and particles 90 formed therein shown in FIGS. 4-7 are non-limiting examples as other shapes are possible. If the precursor material 20 is flowable after being deposited towards the recess 85, the particle may have one surface having the shape of the recess. The excess precursor material 20 that overfills the recess 20 can form another surface of the particle which can tend to be rounded. Surface tension within the precursor material 20 may result in the ultimate peripheral shape of the particle 90 in the MD-CD plane being in conformance with the peripheral shape of the recess 85 in the MD-CD plane.

Particles 90 having the shapes illustrated in FIGS. 4-7 can tend to provide for more optimal packing of such particles in a container since the rounded edges of the particles 90 can slide amongst one another as they are filled into a container, thereby resulting in consistent fill levels amongst containers having the same shape and fill weight.

Figure 5:
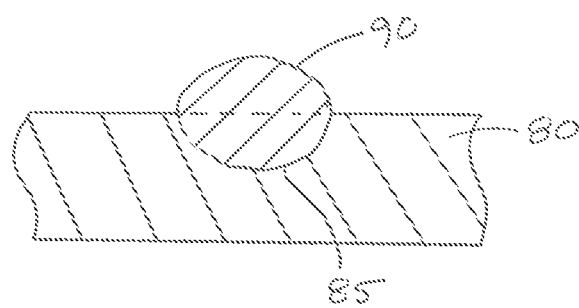
FIG. 5. is a cross section of a portion of a conveyor and a particle formed therein.
Figure 6:
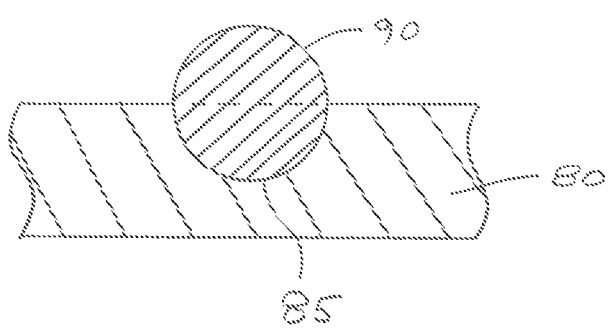
FIG. 6. is a cross section of a portion of a conveyor and a particle formed therein.
Figure 7:
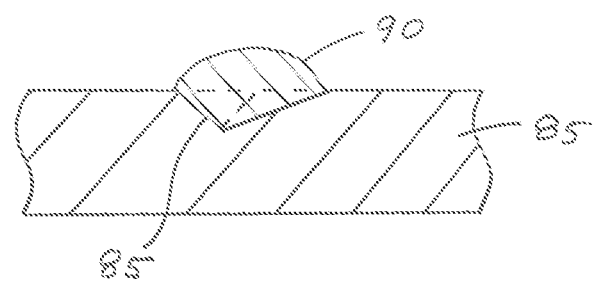
FIG. 7. is a cross section of a portion of a conveyor and a particle formed therein.

The recesses 85 can have a shape of compressed hemispherical, as shown in FIG. 5. Such a shaped recess 85 can be practical for producing particles 90 that are approximately symmetrical on opposite sides of a plane defined by the machine direction MD and cross direction CD. The precursor material 20 deposited in the recess 85 that has a compressed hemispherical shape can conform to that shape. The precursor material 20 that overlies this shape, as can occur by overfilling such recess 20 with precursor material 20, can conform to the peripheral shape of the compressed hemispherical shaped recess 85 and the surface tension within the precursor material 20 can cause the precursor material 20 to be mounded above the precursor material 20 in the recess 85. Surface tension within the precursor material can cause the precursor material 20 to form into a hemispherical or compressed hemispherical shape above the precursor material 20 deposited within the recess 85. When the precursor material 20 cools and solidifies, the particle 90 can have spherical, substantially spherical, or oblate hemispherical shape.

The recess 85 can have any shape desired. For instance, the recess 85 may have a prism shape, as in FIG. 7. The prism shape can be a plurality of flat surfaces. Prism shaped recesses 85 can be practical for forming particles 90 that have a prism shaped part and an opposing part that is more rounded, which might provide for improved packing of the particles 90 in a container.

Figure 8:
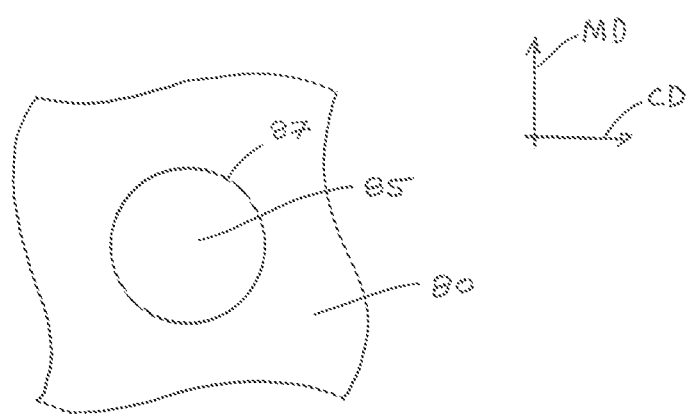
FIG. 8 is top view of a portion of a conveyor.

As shown in FIG. 8, the recesses 85 can have an in plane area defined by the periphery 87 of the recess 85. The periphery 87 of the recess 85 can be circular, as shown in FIG. 8, substantially circular or any other desirable peripheral shape. The periphery 87, which can be in a plane defined by the machine direction MD and the cross direction CD, can define an in-plane area of the recess 85. Each recess 85 has a recess volume defined by the surface of the recess 85 and the plane in which the periphery 87 lies.

The recesses 85 in the conveyor 80 can have an in-plane area within about 25% of one another, or even within about 5% of one another, in a plane defined by the machine direction MD and the cross direction CD. This can tend to aid in producing particles 90 having similar shape to one another.

To provide for substantially uniformly shaped particles 90 or uniformly shaped particles 90, the recesses 85 can have substantially equal in-plane areas in a plane defined by the machine direction MD and the cross direction CD. This can tend to result in particles 90 having relatively uniform shapes. If the manufacturer desires to have a variety of shapes of particles 90, the recesses 90 in the machine direction MD or the recesses 90 disposed in the cross direction CD or the recess 90 disposed in the machine direction MD and cross direction CD can vary in shape.

The shape of the plurality of recesses 85 in a direction orthogonal to a plane defined by the machine direction MD and the cross direction CD can be substantially similar to one another if similarly or the same size particles 90 are desired or can differ from one another if particles 90 having a variety of shapes are desired.

The recesses 85 can be hemispherical shaped. Such recesses 85 can provide for substantially spherical shaped particles 90 when overfilled. When precursor material 20 is deposited into a hemispherical shaped recess 85, half of the particle 90 formed thereby can have a hemispherical shape. Precursor material 20 that is overfilled can be a hump, mound, or bump of precursor material on top of the hemispherical part of the particle 90. If the precursor material 20 is relatively runny, the precursor material 20 may slightly flatten out so that the particle 90 the part of the particle 90 that results from overfilling the recess 85 has a slightly rounded shape. If the precursor material is relatively viscous, the part of the particle 90 that results from overfilling the recess 85 can be more rounded, such as oblate hemispherical, substantially hemispherical, or hemispherical. Without being bound by theory, it is thought that particles 90 that tend to have a shape that tends more towards spherical tend to have more uniform packing when placed in a container. Overfilling the recesses 85 too much can result in particle 90 having thin plate-like portions formed when the precursor material 20 runs over the peripheral edge of the recess 85. Such plate-like portions may break off, possibly resulting in a dusty product. The amount of precursor material 20 deposited to each recess 85 can be from about 105% to about 140% of the recess volume. The amount of precursor material 20 deposited to each recess 85 can be from about 105% to about 155% of the recess volume. The amount of precursor material 20 deposited to each recess 85 can be from about 105% to about 175% of the recess volume. The amount of precursor material 20 deposited to each recess 85 can be from about 105% to about 175% of the recess volume. The amount of precursor material 20 deposited to each recess 85 can be from about 105% to about 200% of the recess volume. The amount of precursor material 20 deposited to each recess 85 can be from about 120% to about 200% of the recess volume.

A hemispherical recess 85 having a diameter from about 1 mm to about 10 mm can be practical for forming particles 90 that can dissolve rapidly in a wash solution. Similarly, an oblate hemispherical recess 85 having an equatorial diameter from about 1 mm to about 10 mm and a distance from the center of the equator to the pole of from about 0.5 mm to about 9 mm.

Figure 9:
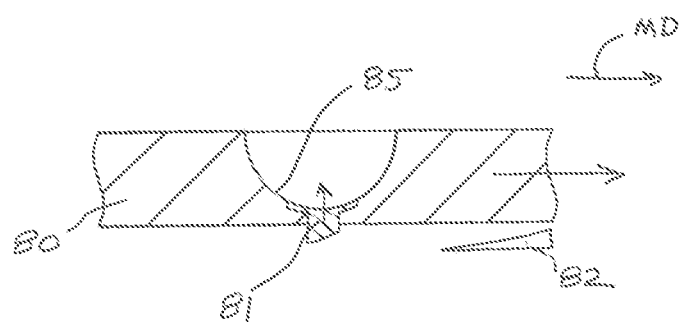
FIG. 9 is a cross section view of a portion of conveyor including an ejection pin.

As shown in FIG. 9, each recess 85 can have an ejection pin 81 moveable relative to the recess 85. The ejection pin 81 can have a component of movement orthogonal to the plane defined by the machine direction MD and the cross direction CD. The ejection pin 81 can be in the base of the recess 85. The ejection pin 81 can protrude beneath the conveyor 80. As the conveyor 80 moves in the machine direction MD, the ejection pin 81 can encounter an object that forces the ejection pin 81 to move in a direction such that there is a component of movement orthogonal to the plane defined by the machine direction MD and the cross direction CD. The mechanism for moving the ejection pin 81 can be a cam system. For example, the ejection pin 81 can be a cam follower that encounters a cam surface 82 that moves the ejection pin. The cam surface can be provide by a shaped object or a rotating roller. For example the conveyor 80 may roll over a roller and as the ejection pin 81 encounters the roller the ejection pin 81 is displaced. When the ejection pin 81 is moved, the particle 90 is partially dislodged or completely dislodged from the recess 85. The particles can be removed from the conveyor 80 via a vacuum or a directional change in movement of the conveyor 80 provided by the conveyor return roller.

For a molten materials, the rheological properties of the materials tend to be temperature dependent. For instance, materials tend to have lower dynamic viscosity with increasing temperature. Since the precursor material 20 is fluid to at least a limited degree when it is deposited on the conveyor 80, the mass of precursor material 20 can deform under its own weight while resting on the conveyor 80. Rheological properties including but not limited to dynamic viscosity, kinematic viscosity, surface tension, and density can have an effect on the shape of particles 90.

As shown in FIG. 1, flow of the precursor material 20 through the feed pipe 40 can be provided by gravity driven flow from the batch mixer 10 and the distributor 30. To provide for more controllable manufacturing, the apparatus 1 can be provided with a feed pump 140, as shown in FIG. 2. The feed pump can be in line with the feed pipe 40, with in line meaning in the line of flow of the precursor material 20. The feed pump 140 can between the batch mixer 10 and the distributor 30. If a stator 100 is employed, the feed pump 140 can be in line with the feed pipe 40, with in line meaning in the line of flow of the precursor material 20. If a stator 100 is employed, the feed pump 140 can be between the batch mixer 10 and the stator 100. In describing the position of the feed pump 140, between is used to describe the feed pump 140 being in-line downstream of the batch mixer 10 and upstream of the distributor 30 or if used, upstream of the stator 100.

Without being bound by theory, it is thought that it is practical to provide an intermediate mixer 55, or static mixer 50 if employed, proximal the distributor 30, or stator 100 if employed, as described herein so that the variation in temperature of the precursor material 20 across a cross section of the feed pipe 40 within the feed pipe 40 is of a relatively uniform temperature across the feed pipe 40 so that the temperature of the precursor material 20 when discharged from the distributor 30, or stator 100 if employed, is relatively uniform.

The static mixer 50, if employed as an intermediate mixer 55, can be positioned in line between the feed pump 140 and the distributor 30, or if used, the stator 100. Advantageously, the static mixer 50, if employed as an intermediate mixer 55, can be upstream of the distributor 30, or if used, the stator 100.

The static mixer 50, if employed as an intermediate mixer 55, has length Z in a direction of flow in the static mixer 50. The length Z of the static mixer 50 is considered to be the amount of length that the static mixer 50 takes up in the transporting the precursor material 20 to the distributor 30 or stator 100, whichever is employed. The static mixer 50 can be a Kenics 1.905 cm inside diameter KMS 6 static mixer 50 that is 19.05 cm long and installed 91.44 cm upstream of the distributor 30 or stator 100. The feed pipe can have an inside diameter of 2.54 cm.

The static mixer 50, if employed as an intermediate mixer 55, can be within less than about 20 lengths Z of the distributor 30 or stator 100 as measured along the feed pipe 40. Without being bound by theory, it is believed that by having the static mixer 50 positioned as such that the variation in temperature across a cross section of the feed pipe 40 once the precursor material 20 reaches the distributor 30 or stator 100 can be reduced. The closer the static mixer 50 is located to the distributor 30 or stator 100, the more uniform the temperature will be across a cross section of the feed pipe 40. The static mixer 50 can be within less than about 10 lengths Z of the distributor 30 or stator 100 as measured along the feed pipe 40. The static mixer 50 can be within less than about 5 lengths Z of the distributor 30 or stator 100 as measured along the feed pipe 40.

The process for forming particles 90 can comprise the steps of: providing a precursor material 20, optionally from a batch mixer 10 in fluid communication with a feed pipe 40; providing the precursor material 20 to the feed pipe 40; providing an intermediate mixer 55 in fluid communication with the feed pipe 40 downstream of the batch mixer 10; passing the precursor material 20 through the intermediate mixer 55; providing a stator 100 in fluid communication with the feed pipe 40; distributing the precursor material 20 to the stator 100; providing a cylinder 110 rotating about the stator 100 and rotatable about a longitudinal axis L of the cylinder 110, wherein the cylinder 110 has a periphery 120 and a plurality of apertures 60 disposed about the periphery 120; passing the precursor material 120 through the apertures 60; providing a conveyor 80 beneath the cylinder 110 moving in translation relative to the longitudinal axis L; depositing the precursor material 20 onto the moving conveyor 80; and cooling the precursor material 20 to form a plurality of particles 90. The conveyor 80 can comprise a plurality of recesses 85 moving in registration with the apertures 60. The precursor material 20 can be deposited in recesses 85 such that the recesses 85 are overfilled with the precursor material 20. The process can be implemented using any of the apparatuses disclosed herein. The process can employ any of the precursor materials 20 disclosed herein to form any of the particles 90 disclosed herein.

Optionally, the precursor material 20 can be deposited in the recesses 85 in an amount that overfills the recesses 85. The process of forming particles 90 can optionally further include a step of removing the particles 90 from the conveyor 80. The process of forming particles 90 can optionally further include a step of providing an ejection pin 81 within each recess 85 and removing the particles 90 from each recess 85 by moving the ejection pin 81.

The precursor material 20 can be any composition that can be processed as a molten material that can be formed into the particles 90 using the apparatus 1 and method described herein. The composition of the precursor material 20 is governed by what benefits will be provided with the particles 90. The precursor material 20 can be a raw material composition, industrial composition, consumer composition, or any other composition that can advantageously be provided in a particulate form.

The precursor material 20 can be a fabric treatment composition. The precursor material 20 can comprise a water soluble polymer. The precursor material 20, and thereby the particles 90, can comprise polyethylene glycol having a weight average molecular weight from about 2000 to about 13000. The precursor material 20, and thereby the particles 90, can comprise more than about 20% by weight polyethylene glycol having a weight average molecular weight from about 2000 to about 13000. The precursor material 20, and thereby the particles 90, can comprise more than about 30% by weight polyethylene glycol having a weight average molecular weight from about 2000 to about 13000. The precursor material 20, and thereby the particles 90, can comprise more than about 40% by weight polyethylene glycol having a weight average molecular weight from about 2000 to about 13000. Polyethylene glycol (PEG) has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, from about 4,000 to about 12,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000.

The precursor material 20, and thereby the particles 90, may comprise from about 65% to about 99% by weight of the composition of PEG. The precursor material 20, and thereby the particles 90, may comprise from about 20% to about 99% by weight of the composition of PEG.

Alternatively, the precursor material 20, and thereby the particles 90, can comprise from about 30% to about 90%, alternatively from about 45% to about 75%, alternatively from about 50% to about 70%, alternatively combinations thereof and any whole percentages or ranges of whole percentages within any of the aforementioned ranges, of PEG by weight of the precursor material 20, and thereby the particles 90.

The precursor material 20, and thereby particles 90, can comprise polyethylene glycol and a material selected from the group consisting of: a polyalkylene polymer of formula H—$(C_2H_4O)_x$—$(CH(CH_3)CH_2O)_y$—$(C_2H_4O)_z$—OH wherein x is from about 50 to about 300, y is from about 20 to about 100, and z is from about 10 to about 200; a polyethylene glycol fatty acid ester of formula $(C_2H_4O)_q$—C(O)O—$(CH_2)_r$—$CH_3$ wherein q is from about 20 to about 200 and r is from about 10 to about 30; a polyethylene glycol fatty alcohol ether of formula HO—$(C_2H_4O)_s$—$(CH_2)_t$—$CH_3$ wherein s is from about 30 to about 250 and t is from about 10 to about 30; and mixtures thereof. The polyalkylene polymer of formula H—$(C_2H_4O)_x$—$(CH(CH_3)CH_2O)_y$—$(C_2H_4O)_z$—OH wherein x is from about 50 to about 300, y is from about 20 to about 100, and z is from about 10 to about 200, can be a block copolymer or random copolymer.

The precursor material 20, and thereby particles 90, can comprise a polyol.

The precursor material 20, and thereby particles 90, can comprise about 20% to about 90% by weight of the precursor material 20 PEG. The precursor material 20, and thereby particles 90, can comprise about 35% to about 37% by weight of the precursor material 20 PEG.

The precursor material 20, and thereby particles 90, can comprise from about 15% to about 40% by weight of the precursor material 20 polyalkylene polymer. The precursor material 20, and thereby particles 90, can comprise from about 20% to about 23% by weight of the precursor material 20 polyalkylene polymer.

The precursor material 20, and thereby particles 90, can comprise about 1 to about 20% by weight of the precursor material 20 polyethylene glycol fatty acid ester. The precursor material 20, and thereby particles 90, can comprise about 5 to about 15% by weight of the precursor material 20 polyethylene glycol fatty acid ester.

The precursor material 20, and thereby particles 90, can comprise about 1 to about 10% by weight of the precursor material 20 polyethylene glycol fatty alcohol ether. The precursor material 20, and thereby particles 90, can comprise about 3 to about 5% by weight of the precursor material 20 polyethylene glycol fatty alcohol ether.

The polyol can be selected from the group consisting of glycerin, sorbitol, and mixtures thereof. The precursor material 20, and thereby particles 90, can comprise 0.1% to about 10% by of the precursor material 20 polyol.

In addition to the PEG in the precursor material 20, and thereby the particles 90, the precursor material 20, and thereby the particles 90, can further comprise 0.1% to about 20% by weight perfume. The perfume can be unencapsulated perfume, encapsulated perfume, perfume provided by a perfume delivery technology, or a perfume provided in some other manner. Perfumes are generally described in U.S. Pat. No. 7,186,680 at column 10, line 56, to column 25, line 22. The precursor material 20, and thereby particles 90, can comprise unencapsulated perfume and are essentially free of perfume carriers, such as a encapsulated perfume. The precursor material 20, and there by particles 90, can comprise perfume carrier materials (and perfume contained therein). Examples of perfume carrier materials are described in U.S. Pat. No. 7,186,680, column 25, line 23, to column 31, line 7. Specific examples of perfume carrier materials may include cyclodextrin and zeolites.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of perfume by weight of the precursor material 20 or particles 90. The perfume can be unencapsulated perfume and or encapsulated perfume.

The precursor material 20, and thereby particles 90, can be free or essentially free of a perfume carrier. The precursor material 20, and thereby particles 90, may comprise about 0.1% to about 20%, alternatively about 1% to about 15%, alternatively 2% to about 10%, alternatively combinations thereof and any whole percentages within any of the aforementioned ranges, of unencapsulated perfume by weight of the precursor material 20, and thereby particles 90.

The precursor material 20, and thereby particles 90, can comprise unencapsulated perfume and encapsulated perfume. The precursor material 20, and thereby particles 90, may comprise about 0.1% to about 20%, alternatively about 1% to about 15%, alternatively from about 2% to about 10%, alternatively combinations thereof and any whole percentages or ranges of whole percentages within any of the aforementioned ranges, of the unencapsulated perfume by weight of the precursor material 20, and thereby particles 90. Such levels of unencapsulated perfume can be appropriate for any of the precursor materials 20, and thereby particles 90, disclosed herein that have unencapsulated perfume.

The precursor material 20, and thereby particles 90, can comprise unencapsulated perfume and encapsulated perfume but be free or essentially free of other perfume carriers. The precursor material 20, and thereby particles 90, can comprise unencapsulated perfume and encapsulated perfume and be free of other perfume carriers.

The precursor material 20, and thereby particles 90, can comprise encapsulated perfume. An encapsulated perfume is perfume oil enclosed within a shell. The shell can have an average shell thickness less than the maximum dimension of the perfume core. The perfume encapsulate can be friable. The perfume encapsulate can be moisture activated perfume encapsulate.

The perfume encapsulates can comprise a melamine/formaldehyde shell. Perfume encapsulates may be obtained from Appleton, Quest International, or International Flavor & Fragrances, or other suitable source. The encapsulate shell can be coated with polymer to enhance the ability of the encapsulate to adhere to fabric. This can be desirable if the particles 90 are designed to be a fabric treatment composition. The encapsulated perfume can be those described in U.S. Patent Pub. 2008/0305982.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of encapsulated perfume by weight of the precursor material 20, or particles 90.

The precursor material 20, and thereby particles 90, can comprise encapsulated perfume but be free of or essentially free of unencapsulated perfume. The precursor material 20, and thereby particles 90, may comprise about 0.1% to about 20%, alternatively about 1% to about 15%, alternatively about 2% to about 10%, alternatively combinations thereof and any whole percentages within any of the aforementioned ranges, of encapsulated perfume by weight of the precursor material 20 or particles 90.

The precursor material 20 can be prepared by providing molten PEG into the batch mixer 10. The batch mixer 10 can be heated so as to help prepare the precursor material 20 at the desired temperature. Perfume can be added to the molten PEG. Dye, if present, can be added to the batch mixer 10. Other adjunct materials can be added to the precursor material 20 if desired.

If dye is employed, the precursor material 20 and particles 90 may comprise dye. The precursor material 20, and thereby particles 90, may comprise less than about 0.1%, alternatively about 0.001% to about 0.1%, alternatively about 0.01% to about 0.02%, alternatively combinations thereof and any hundredths of percent or ranges of hundredths of percent within any of the aforementioned ranges, of dye by weight of the precursor material 20 or particles 90. Examples of suitable dyes include, but are not limited to, LIQUITINT PINK AM, AQUA AS CYAN 15, and VIOLET FL, available from Milliken Chemical.

Optionally the precursor material 20 and particles 90 can comprise clay. The clay can be bentonite. The clay can be provided as a perfume carrier in which the clay carries unencapsulated perfume. The particles can comprise from about 1% to about 40% by weight of the particles clay. The particles can comprise from about 20% to about 35% by weight of the particles clay.

The particles 90 may have a variety of shapes. The particles 90 may be formed into different shapes including tablets, pills, spheres, oblate spheres, and the like. A particle 90 can have a shape selected from the group consisting of spherical, oblate spherical, lentil shaped, and oblong. Lentil shaped refers to the shape of a lentil bean. Oblong shaped refers to a shape having a maximum dimension and a maximum secondary dimension orthogonal to the maximum dimension, wherein the ratio of maximum dimension to the maximum secondary dimension is greater than about 1.2. An oblong shape can have a ratio of maximum base dimension to maximum minor base dimension greater than about 1.5. An oblong shape can have a ratio of maximum base dimension to maximum minor base dimension greater than about 2. Oblong shaped particles can have a maximum base dimension from about 2 mm to about 6 mm, a maximum minor base dimension of from about 2 mm to about 6 mm.

Individual particles 90 can have a mass from about 0.1 mg to about 5 g, alternatively from about 10 mg to about 1 g, alternatively from about 10 mg to about 500 mg, alternatively from about 10 mg to about 250 mg, alternatively from about 0.95 mg to about 125 mg, alternatively combinations thereof and any whole numbers or ranges of whole numbers of mg within any of the aforementioned ranges. In a plurality of particles 90, individual particles can have a shape selected from the group consisting of spherical, oblate spherical, lentil shaped, and oblong.

An individual particle may have a volume from about 0.003 cm$^3$ to about 0.15 cm$^3$. The particles perpendicular dimensions x, y, and z can be such that x is from about 1 to about 2 mm, y is from about 2 mm to about 8 mm, and z is from about 2 mm to about 8 mm. The particles may be lenticular, disk shaped, or any other shape.

A number of particles 90 may collectively comprise a dose for dosing to a laundry washing machine or laundry wash basin. A single dose of the particles 90 may comprise from about 1 g to about 27 g. A single dose of the particles 90 may comprise from about 5 g to about 27 g, alternatively from about 13 g to about 27 g, alternatively from about 14 g to about 20 g, alternatively from about 15 g to about 19 g, alternatively from about 18 g to about 19 g, alternatively combinations thereof and any whole numbers of grams or ranges of whole numbers of grams within any of the aforementioned ranges. The individual particles 90 forming the dose of particles 90 that can make up the dose can have a mass from about 0.95 mg to about 2 g. The plurality of particles 90 can be made up of particles having different size, shape, and/or mass. The particles 90 in a dose can have a maximum dimension less than about 1 centimeter.

Combinations

A. An apparatus (1) for forming particles (90), said apparatus comprising:
a feed pipe (40);
a stator (100) in fluid communication with said feed pipe;
a cylinder (110) rotationally mounted about said stator and rotatable about a longitudinal axis (L) of said cylinder, wherein said cylinder has a periphery (120) and said cylinder comprises a plurality of apertures (60) disposed about said periphery, wherein said apertures are intermittently in fluid communication with said stator as said cylinder rotates about said stator;
a conveyor (80) beneath said cylinder and movable in translation relative to said longitudinal axis, wherein said conveyor comprises a plurality of recesses (85) in registration with said apertures.

B. The apparatus according to Paragraph A, wherein said recesses are substantially hemispherical recesses.

C. The apparatus according to Paragraph A or B, wherein said conveyor has a machine direction (MD) in a direction of operation and a cross direction (CD) orthogonal to said machine direction, wherein said recesses have an in-plane area within about 25% of one another in a plane defined by said machine direction and said cross direction.

D. The apparatus according to Paragraph C, wherein said recesses have an in-plane area within about 5% of one another in a plane defined by said machine direction and said cross direction.

E. The apparatus according to Paragraph C, wherein said recesses have substantially equal in-plane area in a plane defined by said machine direction and said cross direction.

F. The apparatus according to any of Paragraphs A to E, wherein said conveyor has a machine direction in a direction of operation and a cross direction orthogonal to said machine direction, wherein said recesses disposed in said machine direction vary in shape, or said recesses disposed in said cross direction vary in shape, or said recesses disposed in said machine direction and disposed in said cross direction vary in shape.

G. The apparatus according to any of Paragraphs A to F, wherein said recesses are substantially compressed hemispherical recesses.

H. The apparatus according to any of Paragraphs A to G, wherein said conveyor has a machine direction in a direction of operation and a cross direction orthogonal to said machine direction, wherein each recess has an ejection pin moveable relative to said recess, said ejection pin (81) having a component of movement orthogonal to a plane defined by said machine direction and said cross direction.

I. A process of forming particles (90) with the apparatus of any one of Paragraphs A to H, comprising the steps of:
providing a precursor material (20) to said feed pipe;
transporting said precursor material through said feed pipe to said stator;
rotating said cylinder about said stator and rotating said cylinder about said longitudinal axis of said cylinder;
moving said conveyor in translation relative to said longitudinal axis;
passing said precursor material through said apertures;
depositing said precursor material into said recesses; and
cooling said precursor material deposited into said recesses to form a plurality of solid particles (90).

J. The process according to Paragraph I, wherein said precursor material is deposited in said recesses in an amount that overfills said recesses.

K. The process according to Paragraph I or J, wherein said precursor material comprises a water soluble polymer.

L. The process according to Paragraphs I to K, wherein said recesses are substantially hemispherical recesses.

M. The process according to any of Paragraphs I to K, wherein said recesses are substantially oblate hemispherical recesses.

N. The process according to any of Paragraphs I to M, wherein said conveyor has a machine direction in a direction of operation and a cross direction orthogonal to said machine direction, wherein said recesses are sized and dimensioned to provide particles having symmetry in a plane defined by said machine direction and said cross direction.

O. The process according to any of Paragraphs I to N, further comprising the step of removing said solid particles from said conveyor.

P. The process according to any one of Paragraphs I to O, further comprising a step of providing an ejection pin within each said recess and removing said solid particles by moving said ejection pin.

Q. The process according to any one of Paragraphs I to P, wherein said precursor material comprises:
polyethylene glycol; and
a material selected from the group consisting of:
a polyalkylene polymer of formula H—$(C_2H_4O)_x$—$(CH(CH_3)CH_2O)_y$—$(C_2H_4O)_z$—OH wherein
x is from about 50 to about 300, y is from about 20 to about 100, and z is from about 10 to about 200;
a polyethylene glycol fatty acid ester of formula $(C_2H_4O)_q$—C(O)O—$(CH_2)_r$—$CH_3$ wherein q is from about 20 to about 200 and r is from about 10 to about 30;
a polyethylene glycol fatty alcohol ether of formula HO—$(C_2H_4O)_s$—$(CH_2)_t$—$CH_3$ wherein s is from about 30 to about 250 and t is from about 10 to about 30;
and mixtures thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. An apparatus for forming particles, said apparatus comprising:
a feed pipe;
a stator in fluid communication with said feed pipe;
a cylinder rotationally mounted about said stator and rotatable about a longitudinal axis of said cylinder, wherein said cylinder has a periphery and said cylinder comprises a plurality of apertures disposed about said periphery, wherein said apertures are intermittently in fluid communication with said stator as said cylinder rotates about said stator;

a conveyor beneath said cylinder and movable in translation relative to said longitudinal axis, wherein said conveyor comprises a plurality of recesses in registration with said apertures.

2. The apparatus according to claim 1, wherein said recesses are substantially hemispherical recesses.

3. The apparatus according to claim 2, wherein said conveyor has a machine direction in a direction of operation and a cross direction orthogonal to said machine direction, wherein said recesses have an in-plane area within about 25% of one another in a plane defined by said machine direction and said cross direction.

4. The apparatus according to claim 3, wherein said recesses have an in-plane area within about 5% of one another in a plane defined by said machine direction and said cross direction.

5. The apparatus according to claim 3, wherein said recesses have substantially equal in-plane area in a plane defined by said machine direction and said cross direction.

6. The apparatus according to claim 1, wherein said conveyor has a machine direction in a direction of operation and a cross direction orthogonal to said machine direction, wherein said recesses disposed in said machine direction vary in shape, or said recesses disposed in said cross direction vary in shape, or said recesses disposed in said machine direction and disposed in said cross direction vary in shape.

7. The apparatus according to claim 1, wherein said recesses are substantially compressed hemispherical recesses.

8. The apparatus according to claim 1, wherein said conveyor has a machine direction in a direction of operation and a cross direction orthogonal to said machine direction, wherein each recess has an ejection pin moveable relative to said recess, said ejection pin having a component of movement orthogonal to a plane defined by said machine direction and said cross direction.

9. A process of forming particles comprising the steps of:
providing a precursor material to a feed pipe;
providing said precursor material to a stator in fluid communication with said feed pipe;
providing a cylinder rotationally mounted about said stator and rotating about a longitudinal axis of said cylinder, wherein said cylinder has a periphery and said cylinder comprises a plurality of apertures disposed about said periphery, wherein said apertures are intermittently in fluid communication with said stator as said cylinder rotates about said stator;
providing a conveyor beneath said cylinder and moving in translation relative to said longitudinal axis, wherein said conveyor comprises a plurality of recesses moving in registration with said apertures;
passing said precursor material through said apertures;
depositing said precursor material into said recesses; and
cooling said precursor material deposited into said recesses to form a plurality of solid particles.

10. The process according to claim 9, wherein said precursor material is deposited in said recesses in an amount that overfills said recesses.

11. The process according to claim 10, wherein said precursor material comprises a water soluble polymer.

12. The process according to claim 11, wherein said recesses are substantially hemispherical recesses.

13. The process according to claim 11, wherein said recesses are substantially oblate hemispherical recesses.

14. The process according to claim 9, wherein said conveyor has a machine direction in a direction of operation and a cross direction orthogonal to said machine direction, wherein said recesses are sized and dimensioned to provide particles having symmetry in a plane defined by said machine direction and said cross direction.

15. The process according to claim 9, wherein said recesses are substantially hemispherical recesses.

16. The process according to claim 9, wherein said recesses are substantially oblate hemispherical recesses.

17. The process according to claim 9 further comprising the step of removing said solid particles from said conveyor.

18. The process according to claim 17 further comprising a step of providing an ejection pin within each said recess and removing said solid particles by moving said ejection pin.

19. The process according to claim 9, wherein said particles comprise from about 20% to about 99% by weight of said particles polyethylene glycol, perfume, and individually have a mass from about 0.1 mg to about 5 g.

20. The process according to claim 9, wherein said precursor material comprises:
polyethylene glycol; and
a material selected from the group consisting of:
a polyalkylene polymer of formula $H-(C_2H_4O)_x-(CH(CH_3)CH_2O)_y-(C_2H_4O)_z-OH$ wherein x is from about 50 to about 300, y is from about 20 to about 100, and z is from about 10 to about 200;
a polyethylene glycol fatty acid ester of formula $(C_2H_4O)_q-C(O)O-(CH_2)_r-CH_3$ wherein q is from about 20 to about 200 and r is from about 10 to about 30;
a polyethylene glycol fatty alcohol ether of formula $HO-(C_2H_4O)_s-(CH_2)_t-CH_3$ wherein s is from about 30 to about 250 and t is from about 10 to about 30;
and mixtures thereof.

* * * * *